United States Patent
Misawa

(10) Patent No.: US 11,427,096 B2
(45) Date of Patent: Aug. 30, 2022

(54) VEHICLE POWER TRANSMITTING DEVICE WITH ALIGNMENT AND FUNCTION CHECK

(71) Applicant: Toyota Jidosha Kabushiki Kaisha, Toyota Aichi-ken (JP)

(72) Inventor: Takahiro Misawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 470 days.

(21) Appl. No.: 16/006,310

(22) Filed: Jun. 12, 2018

(65) Prior Publication Data

US 2019/0016226 A1 Jan. 17, 2019

(30) Foreign Application Priority Data

Jul. 12, 2017 (JP) ............................. JP2017-136350

(51) Int. Cl.
*H02J 7/00* (2006.01)
*B60L 53/126* (2019.01)
(Continued)

(52) U.S. Cl.
CPC ........... *B60L 53/126* (2019.02); *B60L 53/122* (2019.02); *B60L 53/38* (2019.02); *H02J 7/025* (2013.01); *H02J 50/10* (2016.02); *H02J 50/90* (2016.02)

(58) Field of Classification Search
CPC . Y02E 60/12; H02J 7/025; H02J 5/005; H02J 17/00; H02J 50/90; H02J 50/10;
(Continued)

(56) References Cited

U.S. PATENT DOCUMENTS

| 7,741,734 B2 | 6/2010 | Joannopoulos et al. |
| 2007/0222542 A1 | 9/2007 | Joannopoulos et al. |

(Continued)

FOREIGN PATENT DOCUMENTS

| AU | 2006269374 B2 | 10/2009 |
| AU | 2007349874 A2 | 1/2010 |

(Continued)

*Primary Examiner* — Richard Isla
*Assistant Examiner* — Mohammed J Sharief
(74) *Attorney, Agent, or Firm* — Dinsmore & Shohl LLP

(57) ABSTRACT

A power transmitting device includes: a power transmitting unit that contactlessly transmits alternating-current power to be transmitted to a power receiving unit of a vehicle; a camera that detects a positional relationship between the power transmitting unit and the power receiving unit; and a power supply ECU. The power supply ECU is configured to perform an "alignment process" performing a process using the positional relationship detected by the camera for aligning the power receiving unit with the power transmitting unit, and a "power transmission function check process" causing the power transmitting unit to output a checking power to check whether a power transmission function of the power transmitting unit functions properly. When wireless communication is established with the vehicle, the power supply ECU initially performs the alignment process, and after it is determined that the alignment process completes alignment, the power supply ECU performs the power transmission function check process.

3 Claims, 8 Drawing Sheets

(51) Int. Cl.
*B60L 53/38* (2019.01)
*B60L 53/122* (2019.01)
*H02J 50/90* (2016.01)
*H02J 50/10* (2016.01)
*H02J 7/02* (2016.01)

(58) Field of Classification Search
CPC ...... H01F 38/14; Y02T 90/122; B60L 11/182; B60L 11/1829; B60L 53/38; B60L 53/12; B60L 53/122; B60L 53/124; B60L 53/126
USPC .......................................... 320/108; 307/104
See application file for complete search history.

(56) References Cited

U.S. PATENT DOCUMENTS

| | | | |
|---|---|---|---|
| 2008/0278264 A1 | 11/2008 | Karalis et al. | |
| 2009/0133942 A1* | 5/2009 | Iisaka | H02J 7/00304 320/108 |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0231053 A1 | 9/2010 | Karalis et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0253152 A1 | 10/2010 | Karalis et al. | |
| 2010/0264745 A1 | 10/2010 | Karalis et al. | |
| 2011/0304216 A1* | 12/2011 | Baarman | H02J 50/402 307/104 |
| 2011/0316553 A1* | 12/2011 | Taguchi | B60L 53/122 324/500 |
| 2012/0299390 A1* | 11/2012 | Kim | H02J 50/50 307/104 |
| 2013/0127409 A1 | 5/2013 | Ichikawa | |
| 2013/0193749 A1 | 8/2013 | Nakamura et al. | |
| 2014/0009109 A1* | 1/2014 | Lee | H02J 7/007 320/108 |
| 2014/0111019 A1* | 4/2014 | Roy | G01V 3/10 307/104 |
| 2014/0184150 A1* | 7/2014 | Walley | H02J 5/005 320/108 |
| 2014/0320079 A1 | 10/2014 | Kondo | |
| 2015/0155095 A1* | 6/2015 | Wu | B60L 53/38 307/104 |
| 2015/0278038 A1* | 10/2015 | Halker | H04B 5/0037 714/3 |
| 2015/0323694 A1* | 11/2015 | Roy | H02J 50/12 307/104 |
| 2016/0059723 A1* | 3/2016 | Kim | B60L 53/38 320/108 |

FOREIGN PATENT DOCUMENTS

| | | |
|---|---|---|
| AU | 2010200044 A1 | 1/2010 |
| AU | 2006269374 C1 | 3/2010 |
| CA | 2615123 A1 | 1/2007 |
| CA | 2682284 A1 | 10/2008 |
| CN | 101258658 A | 9/2008 |
| CN | 101442221 A | 5/2009 |
| CN | 101682216 A | 3/2010 |
| CN | 101860089 A | 10/2010 |
| EP | 1902505 A2 | 3/2008 |
| EP | 2130287 A1 | 12/2009 |
| EP | 2720342 A1 | 4/2014 |
| EP | 2902252 A2 | 8/2015 |
| IN | 735/DELNP/2008 | 5/2008 |
| IN | 6195/DELNP/2009 | 7/2010 |
| JP | 2009-501510 A | 1/2009 |
| JP | 2013-115833 A | 6/2013 |
| JP | 2013110822 A | 6/2013 |
| JP | 2013126327 A | 6/2013 |
| JP | 2013146148 A | 7/2013 |
| JP | 2013146154 A | 7/2013 |
| JP | 2013154815 A | 8/2013 |
| KR | 20080031398 A | 4/2008 |
| KR | 20100015954 A | 2/2010 |
| WO | 2007008646 A2 | 1/2007 |
| WO | 2008118178 A1 | 10/2008 |
| WO | 2013108108 A2 | 7/2013 |
| WO | 2014/041410 A2 | 3/2014 |

* cited by examiner

VEHICLE POWER TRANSMITTING DEVICE WITH ALIGNMENT AND FUNCTION CHECK

CROSS-REFERENCE TO RELATED APPLICATIONS

This non-provisional application is based on Japanese Patent Application No. 2017-136350 filed on Jul. 12, 2107, with the Japan Patent Office, the entire contents of which are hereby incorporated by reference.

BACKGROUND

Field

The present disclosure relates to a power transmitting device that transmits alternating-current power contactlessly.

Description of the Background Art

Japanese Patent Laying-Open No. 2013-115833 discloses a power transfer system comprising a power transmitting device having a power transmitting unit (a primary coil) that contactlessly transmits alternating-current power and a vehicle having a power receiving unit (a secondary coil) that contactlessly receives power transmitted from the power transmitting unit. The power transmitting device comprised by the power transfer system checks a power transmission function of the power transmitting device based on a voltage and a current output from the power transmitting unit while the power transmitting unit transmits power.

SUMMARY

In the power transmitting device disclosed in Japanese Patent Laying-Open No. 2013-115833, in order to check the power transmission function of the power transmitting device, it is necessary to actually transmit power from the power transmitting unit. However, when checking the power transmission function, if the power transmitting device has developed an error, unexpected unwanted power may be transmitted. In such a situation, an electromagnetic field leaks to and may have an effect on the surroundings of the power transmitting unit (or primary coil).

The present disclosure is provided to solve the above-mentioned problem, and an object thereof is that, in a power transmitting device having a power transmitting unit that contactlessly transmits power, when checking a power transmission function of the power transmitting device, even if the power transmission function does not function properly and unwanted power is thereby output from the power transmitting unit, an effect on the surroundings of the power transmitting unit is minimized.

(1) According to the present disclosure, a power transmitting device comprises: a power transmitting unit configured to contactlessly transmit alternating-current power to be transmitted to a power receiving unit of a vehicle; a detection device that detects a positional relationship between the power transmitting unit and the power receiving unit; and a controller configured to perform an alignment process performing a process using the positional relationship detected by the detection device for aligning the power receiving unit with the power transmitting unit, and a power transmission function check process performing power transmission by the power transmitting unit to check whether a power transmission function of the power transmitting unit functions properly. The controller is configured to: before starting power transmission by the power transmitting unit, perform the alignment process; and after the alignment process has completed alignment of the power receiving unit with the power transmitting unit start power transmission by the power-transmitting unit to perform the power transmission function check process.

According to the above configuration, after the alignment process has completed alignment of the power receiving unit of the vehicle with the power transmitting unit of the power transmitting device, transmitting power by the power transmitting unit is started and the power transmission function check process is thus performed. Thus whenever the power transmission function check process is performed, the power receiving unit will be present around the power transmitting unit. If the power transmission function does not function properly and unwanted power is output from the power transmitting unit, an effect thereof on other than the power receiving unit of the vehicle can be suppressed. As a result, when performing the power transmission function check process, even if the power transmission function does not function properly and unwanted power is thereby output from the power transmitting unit, an effect on the surroundings of the power transmitting unit can be minimized.

(2) in one embodiment, the controller is configured to perform, in addition to the alignment process and the power transmission function check process, an alignment function check process for checking whether the alignment process functions properly. The controller is configured to: before performing the alignment process, perform the alignment function check process; and when it is determined through the alignment function check process that the alignment process functions properly, perform the alignment process.

The above configuration suppresses performance of the alignment process while the alignment process does not function properly. This allows the alignment process to align the power receiving unit of the vehicle with the power transmitting unit of the power transmitting device more appropriately. If the power transmission function does not function properly and unwanted power is output from the power transmitting unit, an effect thereof on other than the power receiving unit of the vehicle can be suppressed more appropriately.

(3) In one embodiment, the vehicle anther comprises a power storage device connected to the power receiving unit via a charging relay. The vehicle is configured to transmit a power request signal to the power transmitting device when the alignment is completed and the charging relay is in a conducting state. The controller is configured to perform the power transmission function check process after the power request signal is received from the vehicle.

According to the above configuration, the power transmission function check process will be performed when alignment of the power receiving unit of the vehicle with the power transmitting unit of the power transmitting device is completed and the vehicle also has the charging relay in a conducting state. When performing the power transmission function check process, if the power transmission function does not function properly and unwanted power is thereby transferred from the power transmitting unit to the power receiving unit, the power can be absorbed by the power storage device. This can suppress application of excessive voltage to the power receiving unit.

The foregoing and other objects, features, aspects and advantages of the present disclosure will become more apparent from the following detailed description of the present disclosure when taken in conjunction with the accompanying drawings.

DESCRIPTION OF THE EMBODIMENTS

The present disclosure will now be described in embodiments hereinafter in detail with reference to the drawings. In the figures, identical or corresponding components are identically denoted and will not be described redundantly.

<Configuration of Power Transfer System>

Figure 1:
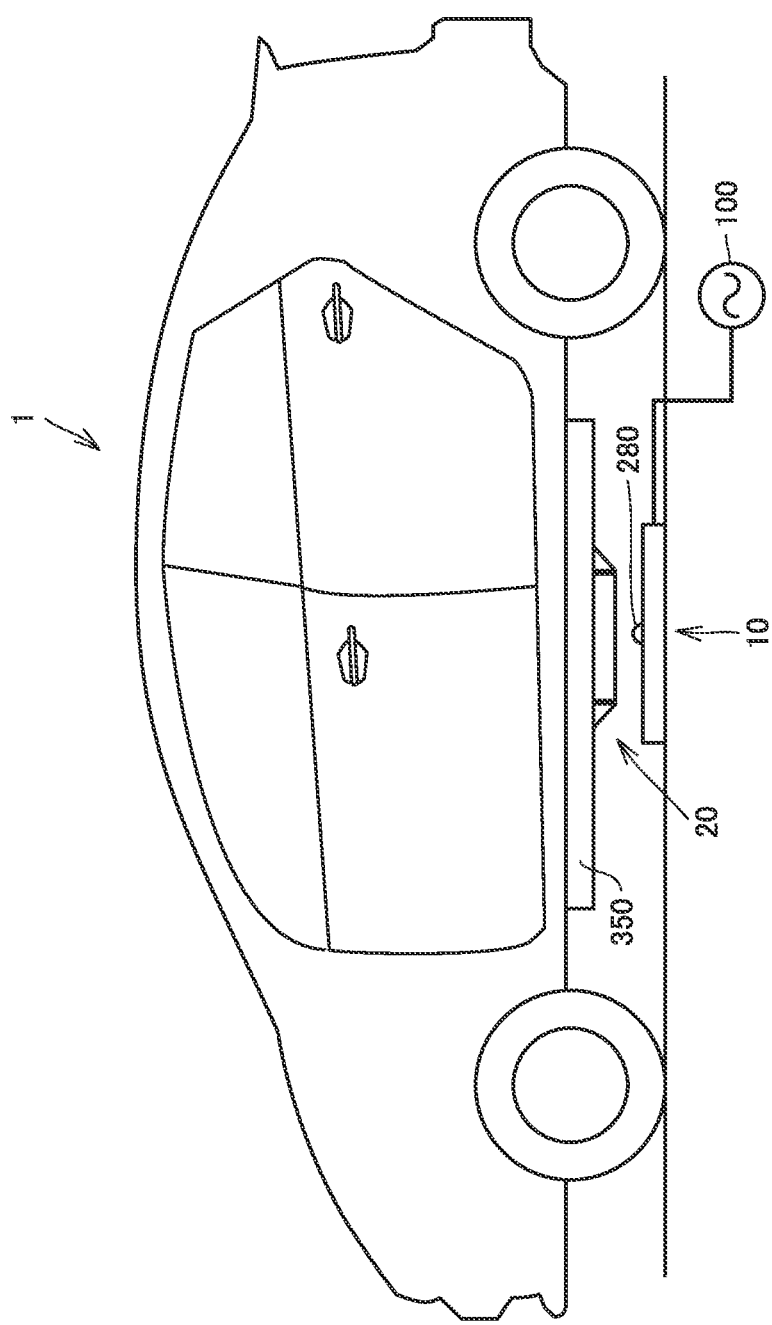
FIG. 1 generally shows a power transfer system.

FIG. 1 generally shows a power transfer system according to the present embodiment. The power transfer system comprises a vehicle 1 and a power transmitting device 10. Vehicle 1 includes a power receiving device 20. Power receiving device 20 is provided on a bottom surface of vehicle 1 and is provided, for example, on a lower surface (a road facing side) of a power storage device 350 installed on a bottom surface of vehicle 1.

Power transmitting device 10 receives power supplied from an alternate current (AC) power supply 100 (for example, a commercial grid power supply). Power transmitting device 10 is installed on the ground and configured to contactlessly transmit power to power receiving device 20 of vehicle 1 via a magnetic field in a state in which vehicle 1 is positioned such that power receiving device 20 faces power transmitting device 10.

Furthermore, power transmitting device 10 includes a camera 280. Camera 280 is equipped with a fisheye lens and is provided substantially at the center of the upper surface of power transmitting device 10. Camera 280 provided with the fisheye lens is configured to capture a large space including power receiving device 20 when vehicle 1 moves toward power transmitting device 10.

Figure 2:
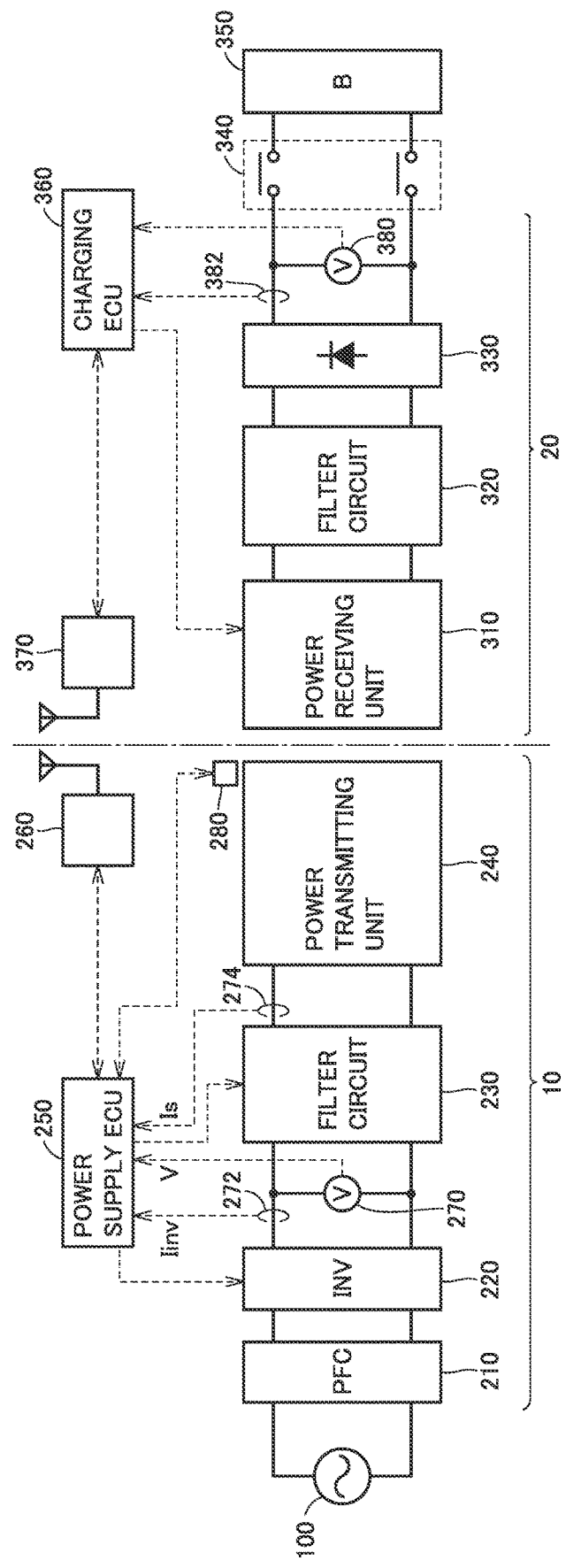
FIG. 2 shows the power transfer system in configuration.

FIG. 2 shows the FIG. 1 power transfer system in configuration. Power transmitting device 10 includes a power factor correction (PFC) circuit 210, an inverter 220, a filter circuit 230, and a power transmitting unit 240. Furthermore, power transmitting device 10 further includes a power supply ECU (Electronic Control Unit) 250, a communication unit 260, a voltage sensor 270, current sensors 272 and 274, and camera 280 (see FIG. 1).

PFC circuit 210 receives power from AC power supply 100, rectifies and increases the power in voltage, and supplies the power to inverter 220, and also brings an input current close to a sinusoidal wave to correct a power factor. PFC circuit 210 can be a variety of types of known PFC circuits. Note that in place of PFC circuit 210, a rectifier which does not have a power factor correcting function may be used.

Inverter 220 is controlled by power supply ECU 250, and receives a direct-current (DC) power from PFC circuit 210 and converts the received DC power to (AC) power having a prescribed frequency (for example of several tens of kHz) to be transmitted. Inverter 220 can change a switching frequency in response to a control signal received from power supply ECU 250 to adjust a frequency of a power to be transmitted (hereinafter also referred to as a "power transmission frequency") with a prescribed resolution. Inverter 220 is composed for example of a single-phase full bridge circuit.

Filter circuit 230 is provided between inverter 228 and power transmitting unit 240 and can suppress harmonic noise generated from inverter 220. Filter circuit 230 is composed of an LC filter including an inductor and a capacitor.

Power transmitting unit 240 receives from inverter 220 through filter circuit 230 AC power (or power to be transmitted) generated by inverter 220, and transmits the power to power receiving unit 310 of power receiving device 20 contactlessly through a magnetic field generated around power transmitting unit 240. Power transmitting unit 240 includes a resonance circuit for transmitting power to power receiving unit 310 contactlessly, as will be described hereinafter. While the resonance circuit can be composed of a coil and a capacitor, the resonance circuit may dispense with the capacitor if the coil can alone form a desired resonant state.

Voltage sensor 270 senses a voltage V output from inverter 220 and outputs the sensed value to power supply ECU 250. Current sensor 272 senses a current flowing through inverter 220, that is, a current liny output from inverter 220, and outputs the sensed value to power supply ECU 250. It should be noted that based on the sensed values of voltage sensor 270 and current sensor 272, the power supplied from inverter 220 to power transmitting unit 240 to be transmitted can be sensed. Current sensor 274 senses a current is flowing to power transmitting unit 240 and outputs the sensed value to power supply ECU 258.

Communication unit 260 is configured to wirelessly communicate with communication unit 30 of power receiving device 20. When power transmitting device 10 transmits power to power receiving device 20, communication unit 260 receives control information of power receiving device 20 transmitted by power receiving device 20 (such as a resonance frequency of power receiving unit 310) and transmits control information of power transmitting device 10 (such as a power transmission frequency) to power receiving device 20.

Power supply ECU 250 includes a CPU (Central Processing Unit), a ROM (Read Only Memory) for storing a processing program or the like, a RAM (Random Access Memory) for temporarily storing data, an input/output port for inputting/outputting various signals, etc., none of which is shown, and receives a signal from each above sensor, etc., and executes control of various devices in power transmitting device 10. Note that each type of control is not necessarily processed by software, and can also be processed by dedicated hardware (or electronic circuitry). What process is specifically performed by power supply ECU 258 will be described in detail later.

Hereinafter, power receiving device 20 will be described. Power receiving device 20 includes a power receiving unit 310, a filter circuit 320, a rectifying unit 330, a charging relay 340, and a power storage device 350. Furthermore, power receiving device 20 further includes a charging ECU 360, a communication unit 370, a voltage sensor 380, and a current sensor 382.

Power receiving unit 310 receives contactlessly through a magnetic field the (AC) power output and thus transmitted from power transmitting unit 240 of power transmitting device 10. Power receiving unit 310 for example includes a resonance circuit (not shown) for receiving power from power transmitting unit 240 contactlessly. The resonance circuit of power receiving unit 330 is composed of a coil and a capacitor.

Filter circuit 320 is provided between power receiving unit 310 and rectifying unit 330, and suppresses harmonic noise generated when power receiving unit 310 receives power. Filter circuit 320 is composed for example of an LC filter including an inductor and a capacitor. Rectifying unit 330 rectifies AC power received by power receiving unit 310 and outputs the rectified power to power storage device 350. Rectifying unit 330 includes a smoothing capacitor together with a rectifier.

Power storage device 350 is a rechargeable direct current (DC) power supply, and includes a lithium-ion or nickel metal hydride battery or a similar secondary battery, Power storage device 350 stores power output from rectifying unit 330. Then, power storage device 350 supplies the stored power to a vehicle driving device (an inverter and a driving motor, etc.) (not shown). Note that an electric double layer capacitor or the like can also be adopted as power storage device 350.

Charging relay 340 is provided between rectifying unit 330 and power storage device 350. Charging relay 340 is brought into conduction (or turned on) when power transmitting device 10 charges power storage device 350. Voltage sensor 380 senses voltage output from rectifying unit 330 (or received power's voltage) and outputs the sensed value to charging ECU 360. Current sensor 382 senses a current output from rectifying-unit 330 (or received power's current) and outputs the sensed value to charging ECU 360. Based on the sensed values of voltage sensor 380 and current sensor 382, power received by power receiving unit 310, which corresponds to power charged to power storage device 350, can be sensed. Voltage sensor 380 and current sensor 382 may be provided between power receiving unit 310 and rectifying unit 330 (for example, between filter circuit 320 and rectifying unit 330).

Charging ECU 360 includes a CPU, a ROM, a RAM, an input/output port, and the like, none of which is shown, and receives a signal from each above sensor and the like and also controls various types of devices in power receiving device 20. Note that each type of control is not necessarily processed by software, and can also be processed by dedicated hardware (or electronic circuitry).

While power is received from power transmitting device 10, charging ECU 360 generates a target of power in power transmitting device 10 to be transmitted (a target power) so that power receiving device 20 receives power of a desired target. Then, charging ECU 360 transmits the generated target of power to be transmitted (or the target power) to power transmitting device 10 by communication unit 378.

Communication unit 370 is configured to wirelessly communicate with communication unit 260 of power transmitting device 10. When power transmitting device 10 transmits power to power receiving device 20, communication unit 370 receives control information transmitted from power transmitting device 10 (such as a power transmission frequency) and transmits control information of power receiving device 20 to power transmitting device 10 (such as a resonance frequency of power receiving unit 310). Furthermore, as described above, communication unit 370 receives data (a position detection result) indicative of a relative positional relationship between power transmitting device 10 and power receiving device 20 from charging ECU 360 and transmits the data to power transmitting device 10.

In this power transfer system, in power transmitting device 10, AC power to be transmitted is supplied from inverter 220 through filter circuit 230 to power transmitting unit 240. When the AC power to be transmitted is supplied to power transmitting unit 240, energy (or power) moves from power transmitting unit 240 to power receiving unit 310 through a magnetic field formed between a power transmitting coil of power transmitting unit 240 and a power receiving coil of power receiving unit 310. The energy (or power) moved to power receiving unit 310 is supplied to power storage device 350 through filter circuit 320 and rectifying unit 330.

<Process to be Performed by Power Transmitting Device>

Hereinafter, a process performed by power supply ECU 250 of power transmitting device 10 will be described.

<<Alignment Process>>

Power supply ECU 230 can use an image captured by camera 280 to perform a process to align power transmitting unit 240 of power transmitting device 10 and power receiving unit 310 of vehicle 1 (hereinafter also referred to as an "alignment process").

The alignment process includes a "position detection process" and a "position determination process." The "position detection process" is a process using an image captured by camera 280 to detect (or calculate) a relative positional relationship of power receiving unit 310 of vehicle 1 relative to power transmitting unit 240 of power transmitting device 10. The "position determination process" is a process using the positional relationship detected through the position detection process to determine whether power receiving unit 310 of vehicle 1 is present at a reference position facing power transmitting unit 240 of power transmitting device 10.

In addition to the above-described "position detection process" and "position determination process," the alignment process may also include a "position guiding process." The "position guiding process" is a process performed to transmit information (e.g., image data captured by camera 280) to vehicle 1 via communication, unit 260 for guiding vehicle 1 to align with power transmitting device 10. Vehicle 1 receiving the information transmitted from power transmitting device 10 through the position guiding process, can obtain a relative positional relationship of vehicle 1 with respect to power transmitting device 10 and notify the user of the obtained positional relationship.

When it is determined that the above-described alignment process has completed alignment of vehicle 1 with power transmitting device 10, power supply ECU 250 transmits notification of completion of alignment to vehicle 1 via communication unit 260. When vehicle 1 receives the notification of completion of alignment from power transmitting device 10, vehicle 1 brings charging relay 340 into conduction for turns it on) to perform a charging preparation, and once the charging preparation has been completed, vehicle 1 transmits a power request signal via communication unit 370 to power transmitting device 10.

<<Position Detection Function Check Process>>

Power supply ECU 250 performs a process for checking whether the position detection process in the alignment process described above functions properly (hereinafter also referred to as a "position detection function check process"). For example, power supply ECU 250 performs the position detection function check process to determine whether camera 280 is faulty, and when camera 280 is not faulty, determine that the position detection process functions properly.

<<Controlling Power to be Transmitted>>

Power supply ECU 250 drives inverter 220 to transmit power to power receiving device 20, and when power supply ECU 250 drives inverter 220, power supply ECU 250 adjusts a duty of a switching operation of inverter 220 to control the power to be transmitted to be a target power in magnitude.

Figure 3:
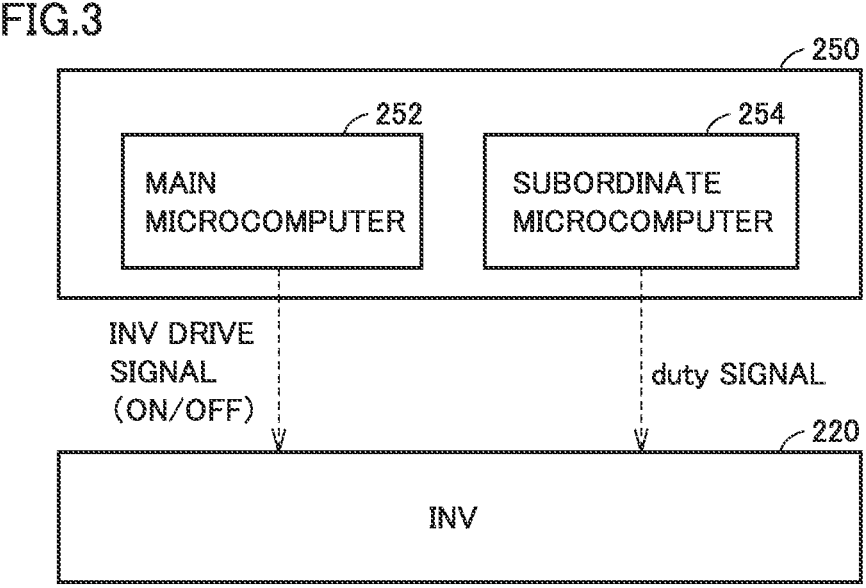
FIG. 3 is a diagram for illustrating a power transmission function.

FIG. 3 is a diagram for illustrating a function allowing power supply ECU 250 to drive inverter 220 to transmit power to power receiving device 26 or to interrupt the power transmission, (hereinafter also simply referred to as a "power transmission function"). As shown in FIG. 3, power supply ECU 250 has a mam microcomputer 252 and a subordinate microcomputer 254.

Main microcomputer 252 generates an INV drive signal which determines driving (or turning on) or stopping (or turning off) inverter 220, and transmits the signal to inverter 220. Thus, inverter 220 is controlled to a state in response to the INV drive signal. When the INV drive signal is "ON," inverter 220 is brought to a driven (ON) state and outputs power corresponding to a duty signal generated by subordinate microcomputer 254.

In contrast, when the INV drive signal is "OFF," inverter 220 is brought to a stopped (OFF) state, and interrupts power transmission regardless of the duty signal generated by subordinate microcomputer 254. Thus, current Iinv output from inverter 220 is 0 ampere.

Subordinate microcomputer 254 generates a duty signal for adjusting a duty of a switching operation of inverter 220 and transmits the duty signal to inverter 220. Inverter 220 outputs power corresponding to the duty signal when the INV drive signal from main microcomputer 252 is in the "ON" state. Thus, power transmission to power receiving device 20 is performed.

Note that when the duty signal is "0%," inverter 220 is brought to a substantially stopped state and interrupts power transmission regardless of the INV drive signal generated by main microcomputer 252. Thus, current Iinv output from inverter 220 is 0 ampere.

<<Power Transmission Function Check Process>>

Power supply ECU 250 can perform a process for checking whether the above-described power transmission function functions properly (hereinafter also referred to as a "power transmission function check process").

The power transmission function check process includes a "power transmission check process" and an "interruption check process".

The "power transmission check process" is a process in which a command signal (the above-described INV drive signal and duty signal) is transmitted to inverter 220 to output a minimum power required for checking power transmission (hereinafter also referred to as a "checking power") and whether the power as indicated by the command is output is checked based on values sensed by voltage sensor 270 and current sensor 272.

The "interruption check process" is a process in which a command signal (the above-described INV drive signal and duty signal) is transmitted to inverter 220 to cause it to interrupt power transmission and whether the power transmission is interrupted as indicated by the command is checked based on a value sensed by current sensor 272.

The interruption check process is performed for main microcomputer 252 and subordinate microcomputer 254 separately.

Figure 4:
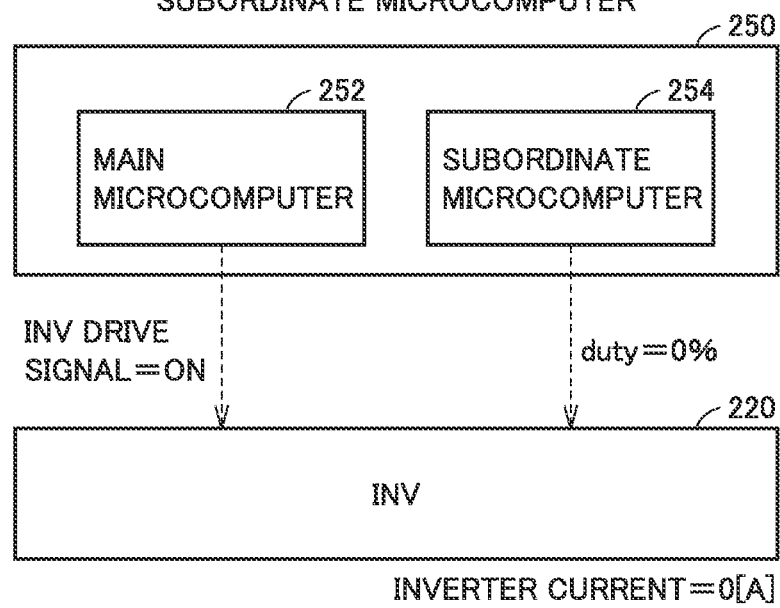
FIG. 4 is a diagram for illustrating an interruption check process for a subordinate microcomputer.

FIG. 4 is a diagram for illustrating an interruption check process for subordinate microcomputer 254. When subordinate microcomputer 254 undergoes the interruption check process, main microcomputer 252 outputs the INV drive signal of "ON" and subordinate microcomputer 254 outputs the duty signal of "0," and in that condition, whether inverter 220 outputs current Iinv (or current sensor 272 senses a value) of 0 ampere is determined. If output current Iinv is equal to zero ampere, it is determined that the interruption function of subordinate microcomputer 254 junctions properly, whereas if output current Iinv is larger than, zero ampere, it is determined that the interruption function of subordinate microcomputer 254 does not function properly.

Figure 5:
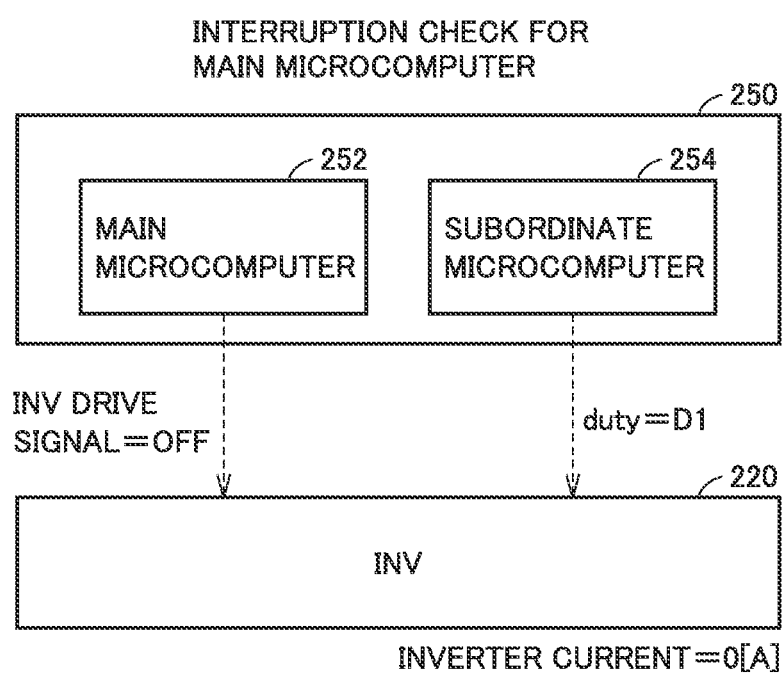
FIG. 5 is a diagram for illustrating an interruption check process for a mam microcomputer.

FIG. 5 is a diagram for illustrating an interruption check process for main microcomputer 252. When main microcomputer 252 undergoes the interruption check process, subordinate microcomputer 254 outputs the duty signal of "D1%," where D1>0%, and main microcomputer 252 outputs the INV drive signal of "OFF," and in that condition, whether inverter 220 outputs current Iinv (or current sensor 272 senses a value) of 0 ampere is determined. If output current Iinv is equal to zero ampere, it is determined that the interruption function of main microcomputer 252 functions properly, whereas if output current Iinv is larger than zero ampere, it is determined that the interruption function of main microcomputer 252 does not function properly.

<Timing to Perform Power Transmission Function Check Process>

When performing the power transmission function check described above, if the power transmission function has already developed an error, unwanted power (e.g., excessive power exceeding the checking power) different than a command may be output from power transmitting unit 240 or power transmission may no longer be able to be normally interrupted, etc. If such a situation arises, power transmitting unit 240 may output power with vehicle 1 absent over power transmitting unit 240, and an electromagnetic field may leak around and affect the surroundings of power transmitting unit 240.

Accordingly, in the present embodiment, once a wireless communication with vehicle 1 has been established, power supply ECU 250 of power transmitting device 10 initially performs the alignment process, and after it is determined that the alignment process has completed alignment of power receiving unit 310 of vehicle 1 with power transmitting unit 240 of power transmitting device 10 power supply ECU 250 starts outputting the checking power to perform the power transmission function check process. Thus whenever the power transmission function check process is performed, power receiving unit 310 of vehicle 1 will be present over power transmitting unit 240. If the power transmission function has an error and unwanted power is output from power transmitting unit 240, an effect of leakage of an electromagnetic field on other than power receiving unit 310 of vehicle 1 can be suppressed.

Figure 6:
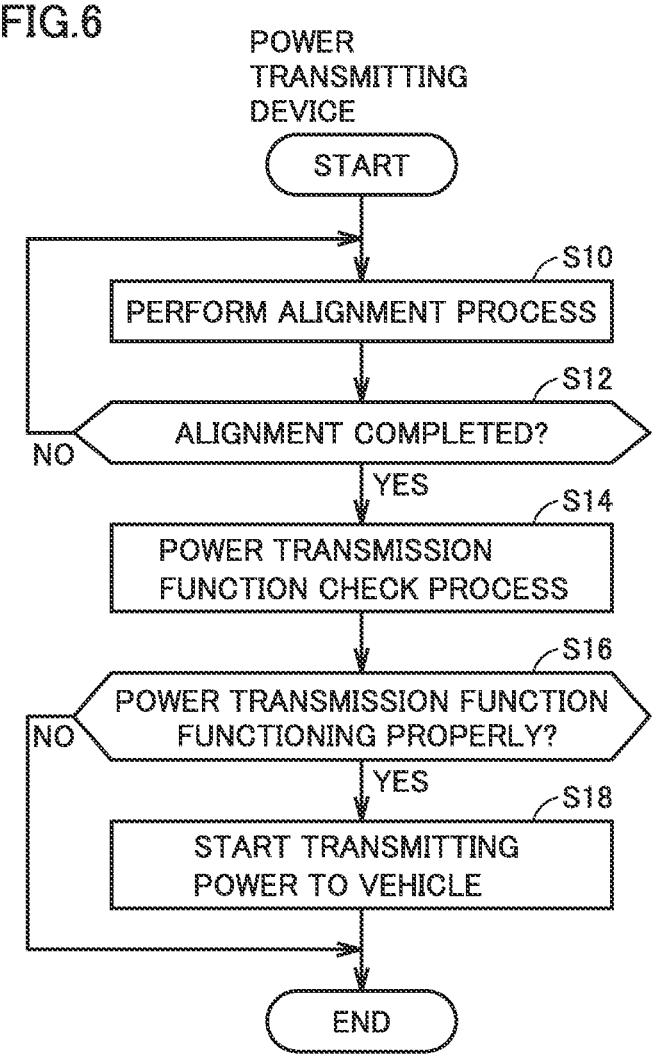
FIG. 6 is a flowchart (No. 1) showing an example of a procedure of a process performed by a power supply ECU of a power transmitting device.

FIG. 6 is a flowchart showing an example of a procedure of a process performed when power supply ECU 250 of power transmitting device 10 performs the alignment process and the power transmission function check process.

This flowchart starts when a wireless communication is established between power transmitting device 10 and vehicle 1.

Initially, power supply ECU 250 performs the alignment process (step S10). As has been previously discussed, the alignment process includes the "position detection process" and the "position-determination process." Furthermore, the alignment process may further include a "position guiding process."

Subsequently, power supply ECU 250 determines whether the alignment process (more specifically, the position determination process) has completed alignment of vehicle 1 with power transmitting device 10 (step S12). If it is not determined that the alignment is completed (NO in step S12), power supply ECU 250 returns the process to S10 and continues the alignment process.

When it is determined that the alignment is completed (YES in step S12), power supply ECU 250 performs the power transmission function check process (step S14). As has been previously discussed, the power transmission function check process includes the "power transmission check process" and the "interruption check process." Furthermore, the "interruption check process" is performed for main microcomputer 252 and subordinate microcomputer 254 separately (see FIGS. 4 and 5).

Subsequently, from a result of the power transmission function check process, power supply ECU 250 determines whether the power transmission function of power transmitting device 10 functions properly (step S16). When the power transmission function of power transmitting device 10 does not function properly (NO step S16), power supply ECU 250 does not start transmitting power to vehicle 1 and ends the process.

When the power transmission function of power transmitting device 10 functions properly (YES in step S16), power supply ECU 250 starts transmitting power to vehicle 1 (step S18).

Thus, according to the present embodiment, once a wireless communication with vehicle 1 has beers established, power supply ECU 250 of power transmitting device 10 initially performs the alignment process, and after it is determined that the alignment process has completed alignment of vehicle 1 with power transmitting device 10, power supply ECU 250 starts outputting the checking power to perform the power transmission function check process. Thus whenever the power transmission function check process is performed, power receiving unit 310 of vehicle 1 will be present over power transmitting unit 240. If the power transmission function has an error and unwanted power is output from power transmitting unit 240, an effect of leakage of an electromagnetic field on other than power receiving unit 310 of vehicle 1 can be suppressed. As a result, when performing the power transmission function check process, evert if the power transmission function does not function properly and unwanted power is thereby output from power transmitting unit 240, an effect on the surroundings of power transmitting unit 240 can be minimized.

[First Exemplary Variation]

In the above embodiment, it is initially determined that the alignment process (more specifically, the position detection process) has completed alignment of vehicle 1 with power transmitting device 10 and thereafter the power transmission function check process is performed to suppress an effect of leakage of an electromagnetic field on other than vehicle 1 due to an error of the power transmission function.

If the function of the position detection process per se does not function properly, however, whether alignment is completed cannot be normally determined, and as a result an effect, of leakage of an electromagnetic field due to an error of the power transmission function may not be appropriately suppressed.

In view of this, according to a first exemplary variation, power supply ECU 250, before starting the alignment process, performs a "position detection function check process" to check whether the position detection process functions properly, and when it is determined that the position detection process functions properly, power supply ECU 250 performs the alignment process.

Figure 7:
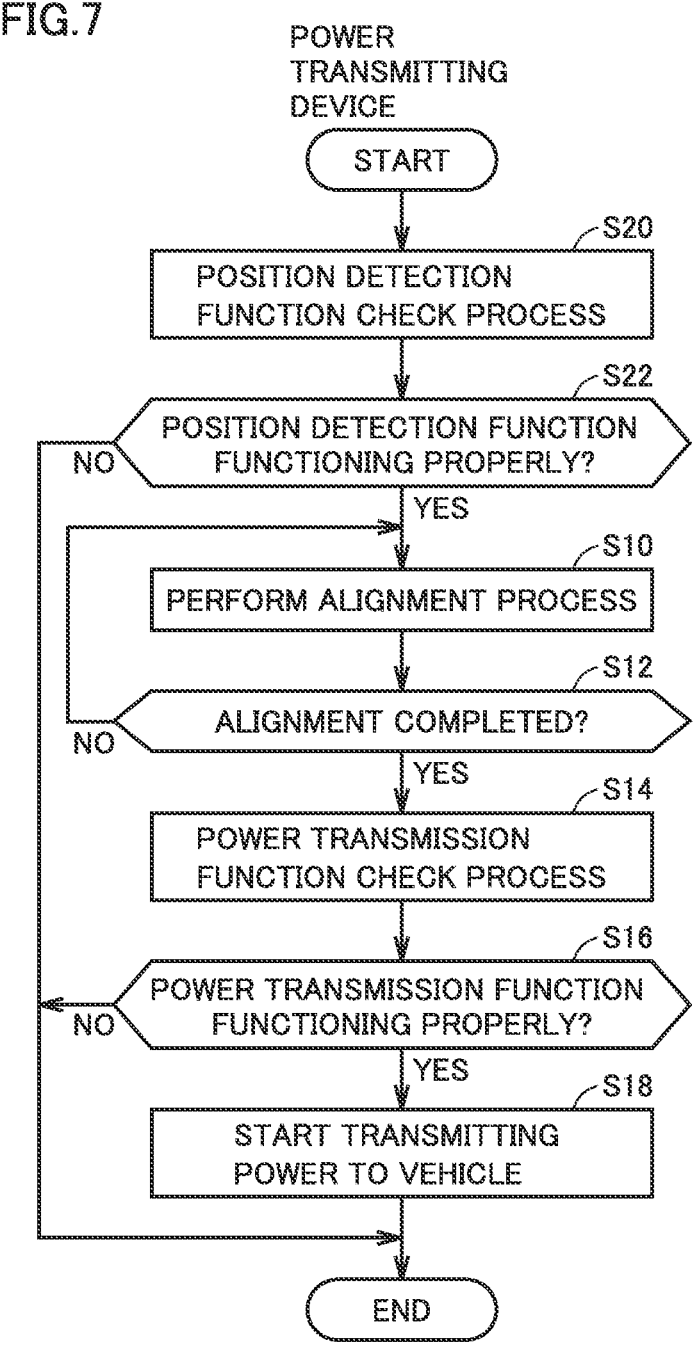
FIG. 7 is a flowchart (No. 2) showing an example of a procedure of a process performed by the power supply ECU of the power transmitting device.

FIG. 7 is a flowchart showing an example, of a procedure of a process performed by power supply ECU 250 in the first exemplary variation. The FIG. 7 flowchart starts when a wireless communication is established between power transmitting device 10 and vehicle 1. The flowchart shown in FIG. 7 corresponds to that shown in FIG. 6 plus steps S20 and S22. The other steps (the steps having numbers identical to those shown in FIG. 6) have already been described, and accordingly, will not be described redundantly.

When a wireless communication is established between power transmitting device 10 and Vehicle 1, power supply ECU 250 initially performs the position detection function check process (step S20). More specifically, before performing the alignment process (more specifically, the position determination process), power supply ECU 250 performs the position detection function check process.

Subsequently, power supply ECU 250 determines whether the position detection function functions properly (step S22). If the position detection function does not function properly (NO in step S22), power supply ECU 250 ends the process.

If the position detection function functions properly (YES in step S22), power supply ECU 250 performs a process following step S10 (the alignment process).

Thus, according to the first exemplary variation, power supply ECU 250 performs the position detection function check process before performing, the alignment process (more specifically, the position determination process), and when it is determined that the position detection process functions properly, power supply ECU 250 performs the alignment process. This can suppress performance of a process subsequent to the alignment process while the position detection process does not function properly. This can more appropriately suppress an effect of leakage of an electromagnetic field due to an error of the power transmission function on other than power receiving unit 310 of vehicle 1.

[Second Exemplary Variation]

In the above embodiment, the power transmission function check process is performed after vehicle 1 is completely aligned with power transmitting device 10. Accordingly, whenever the power transmission function check process is performed, power receiving unit 310 of vehicle 1 will be present over power transmitting unit 240 of power transmitting device 10. At the time, if vehicle 1 has power receiving unit 310 disconnected from power storage device 350 (that is, when charging relay 340 is out of conduction), and the power transmission function has developed an error and excessive power exceeding the checking power is output from power transmitting unit 240, an excessive voltage may be applied to power receiving unit 310, which may cause a failure of power receiving unit 310.

In view of this, according to a second exemplary variation, power supply ECU 250 performs the power transmission Emotion check process after a power request signal is received from vehicle 1 (that is, after vehicle 1 has charging relay 340 brought into conduction for turned on) and a charging preparation is completed).

Figure 8:
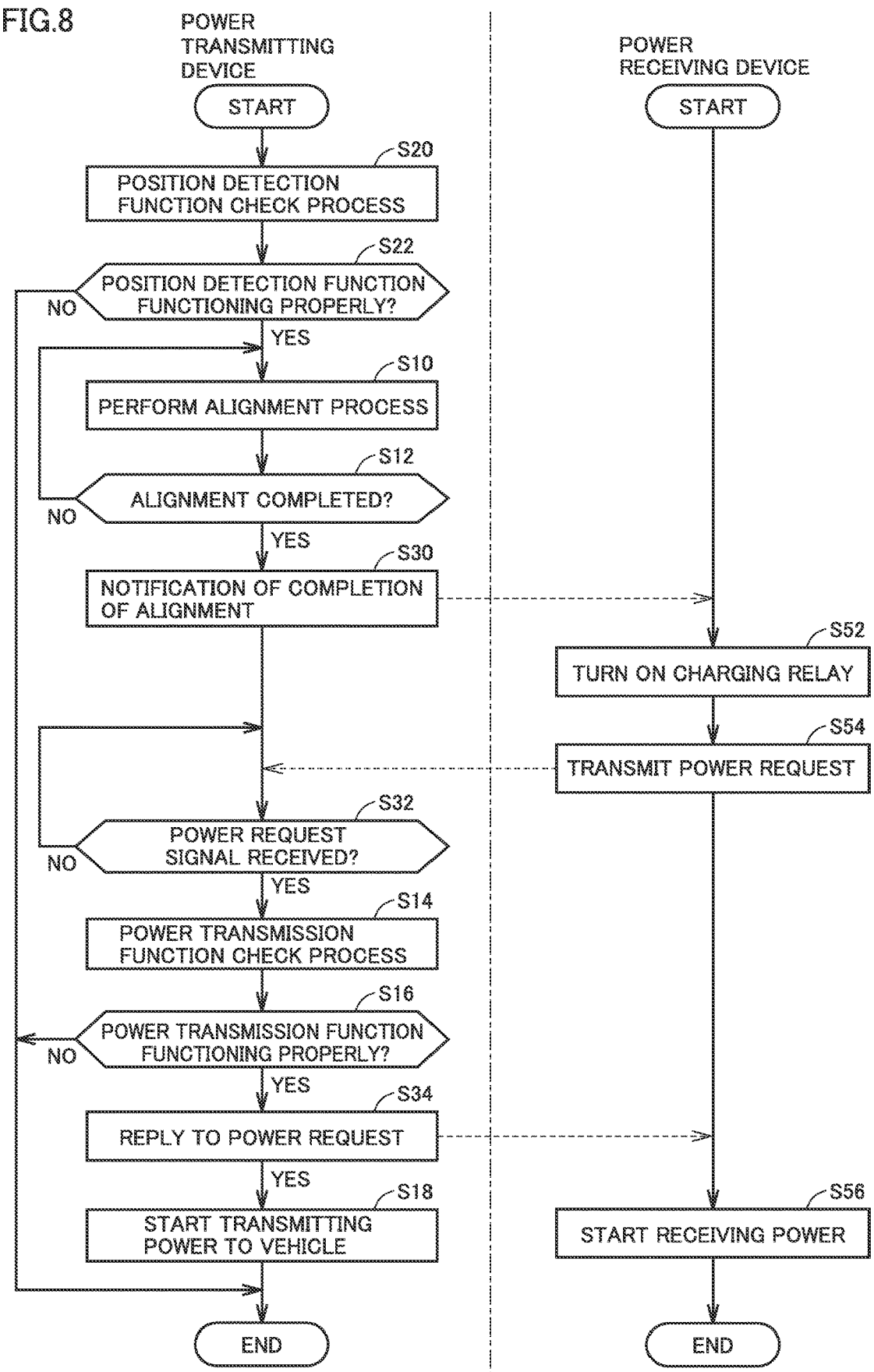
FIG. 8 is a flowchart showing an example of a procedure of a process performed by the power supply ECU of the power transmitting device and a charging ECU of a power receiving device.

FIG. 8 is a flowchart showing an example of a procedure of a process performed by power transmitting device 10 (power supply ECU 250) and power receiving device 20 (charging ECU 360) in the second exemplary variation.

Initially, an example of the procedure of the process performed by power transmitting device 10 (power supply ECU 250) will be described. The procedure of the process performed by power transmitting device 10 is shown in FIG. 8 on the left side. The flowchart shown in FIG. 8 on the left side corresponds to that shown in FIG. 7 plus steps S30, S32 and S34. The other steps (the steps having numbers identical to those shown in FIG. 7) have already been described, and accordingly, will not be described redundantly.

When power supply ECU 250 determines that the alignment is completed (YES in step S12), power supply ECU 250 transmits notification of completion of alignment to vehicle 1 via communication unit 260 (step S30).

Subsequently, power supply ECU 250 determines whether a power request signal has been received from vehicle 1 (step S32). If the power request signal has not been received (NO in step S32), power supply ECU 250 repeats step S32.

When the power request signal is received (YES in step S32), power supply ECU 250 assumes that vehicle 1 has charging relay 340 brought into conduction (or turned on) and a charging preparation is completed, and power supply ECU 250 performs the power transmission function check process (Step S14).

When the power transmission function functions properly (YES in step S16), power supply ECU 250 responds to the power request signal by transmitting a reply to vehicle 1 (step S34), and starts transmitting power to vehicle 1 (step S18).

Hereinafter, an example of the procedure of the process performed by power receiving device 20 (charging ECU 360) of vehicle 1 shown in FIG. 8 on a right side will be described. The procedure of the process performed by power receiving de vice 20 (charging ECU 360) is shown in FIG. 8 on the right side, and starts when communication is established with power transmitting device 10.

As charging ECU 360 receives notification of completion of alignment from power transmitting device 10 via communication unit 370, charging ECU 360 brings charging relay 340 into conduction (or turns it on) mid makes a charging preparation (step S52).

Once the charging preparation is completed, charging ECU 360 transmits a power-request signal to power transmitting device 10 via communication unit 370 (step S54).

Subsequently, when charging ECU 360 receives from power transmitting device 10 a reply to the power request signal, charging ECU 360 starts a process for receiving power transmitted from power transmitting device 10 (step S56).

Thus, according to the second exemplary variation, power supply ECU 250 performs the power transmission function check process after a power request signal is received from vehicle 1 (that is, after vehicle 1 has charging relay 340 brought into conduction (or turned on) and a charging preparation is completed). If the power transmission function has developed an error and excessive power exceeding the checking power is transmitted from power transmitting unit 240 to power-receiving unit 310, the power can be absorbed by power storage device 350. This can suppress application of excessive voltage to power receiving unit 310.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A power transmitting device comprising:
a power transmitting unit configured to contactlessly transmit alternating-current power to be transmitted to a power receiving unit of a vehicle;
a power electronic control unit including a main computing device and a subordinate computing device, a main interruption check process for checking interruption of power for the main computing device is independent from a subordinate interruption check process for checking interruption of power for the subordinate computing device;
a detection device that detects a positional relationship between the power transmitting unit and the power receiving unit; and
a controller configured to perform an alignment process using the positional relationship detected by the detection device for aligning the power receiving unit with the power transmitting unit, and a power transmission function check process using the power transmitting unit to check whether a power transmission function of the power transmitting unit functions properly,
the controller being configured to:
before starting power transmission by the power transmitting unit, perform the alignment process;
after the alignment process has completed alignment of the power receiving unit with the power transmitting unit, instruct the power transmitting unit to transmit a first power for performing the power transmission function check process; and
when it is determined through the power transmission function check process that the power transmission function of the power transmitting unit functions properly, instruct the power transmitting unit to transmit a second power to the vehicle.

2. The power transmitting device according to claim 1, wherein
the controller is configured to perform, in addition to the alignment process and the power transmission function check process, an alignment function check process for checking whether the alignment process functions properly, and
the controller is configured to:
before performing the alignment process, perform the alignment function check process; and
when it is determined through the alignment function check process that the alignment process functions properly, perform the alignment process.

3. The power transmitting device according to claim 1, wherein
the vehicle further comprises a power storage device connected to the power receiving unit via a charging relay,
the vehicle is configured to transmit a power request signal to the power transmitting device when the alignment is completed and the charging relay is in a conducting state, and the controller is configured to perform the power transmission function check process after the power request signal is received from the vehicle.

\* \* \* \* \*